US006924802B2

(12) United States Patent
Fossum et al.

(10) Patent No.: US 6,924,802 B2
(45) Date of Patent: Aug. 2, 2005

(54) EFFICIENT FUNCTION INTERPOLATION USING SIMD VECTOR PERMUTE FUNCTIONALITY

(75) Inventors: Gordon Clyde Fossum, Austin, TX (US); Harm Peter Hofstee, Austin, TX (US); Barry L. Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 10/242,566

(22) Filed: Sep. 12, 2002

(65) Prior Publication Data

US 2004/0051713 A1 Mar. 18, 2004

(51) Int. Cl.[7] .................. G06T 11/20; G06F 15/76
(52) U.S. Cl. .................. 345/440; 345/442; 712/2; 712/4; 712/7; 712/22
(58) Field of Search ................. 345/440, 442; 712/2, 4, 7, 22, 23; 717/151

(56) References Cited

U.S. PATENT DOCUMENTS

| 5,809,292 A | 9/1998 | Wilkinson et al. |
| 5,949,695 A | 9/1999 | Snell |
| 5,973,705 A | 10/1999 | Narayanaswami |
| 5,991,865 A | 11/1999 | Longhenry et al. |
| 6,128,637 A | 10/2000 | Yasui et al. |
| 6,202,077 B1 | 3/2001 | Smith |
| 6,292,886 B1 | 9/2001 | Makineni et al. |
| 6,334,176 B1 * | 12/2001 | Scales et al. .................. 712/4 |
| 2001/0005429 A1 | 6/2001 | Ishiga et al. |
| 2001/0021941 A1 | 9/2001 | Arakawa et al. |
| 2003/0167460 A1 * | 9/2003 | Desai et al. ................. 717/151 |

FOREIGN PATENT DOCUMENTS

EP 0 853 292 A2 7/1998

* cited by examiner

*Primary Examiner*—Matthew C. Bella
*Assistant Examiner*—Anthony J. Blackman
(74) *Attorney, Agent, or Firm*—Carr LLP; Diane R. Gerhardt

(57) ABSTRACT

A system, method, and computer program product are provided for generating display data. The data processing system loads coefficient values corresponding to a behavior of a selected function in pre-defined ranges of input data. The data processing system then determines, responsive to items of input data, the range of input data in which the selected function is to be estimated. The data processing system then selects, through the use of a vector permute function, the coefficient values, and evaluates an index function at the each of the items of input data. It then estimates the value of the selected function through parallel mathematical operations on the items of input data, the selected coefficient values, and the values of the index function, and, responsive to the one or more values of the selected function, generates display data.

33 Claims, 7 Drawing Sheets

INITIALIZATION OF SELECTOR QUADWORD

DETAIL OF A BYTE IN SELECTOR QUADWORD

EFFICIENT FUNCTION INTERPOLATION USING SIMD VECTOR PERMUTE FUNCTIONALITY

BACKGROUND OF THE INVENTION

1. Field of the Invention

The invention relates generally to estimation of functions for the generation of visual display data and, more particularly, to providing interpolative estimates of functions using the vector permute functionality of parallel-processing machines.

2. Description of the Related Art

The ongoing revolution in the use of data processing systems to provide advanced modeling, simulation, video editing, animation, and gaming applications has illustrated the importance of continuing improvement in the generation and display of graphical output. Improvement in the generation and display of graphical output centers on two concerns. First, there is a need to supply visual display data of the highest possible resolution. This need centers on the volume of data supplied. Second, there is a need to supply visual display data at the highest rate possible. These two concerns converge, for example, in gaming, where the desire for high levels of detail conflicts with a maximum acceptable lag time between the receipt of data from input controllers and the graphical output of visual display data through visual display systems.

Producers of visual display data systems struggle to generate and display the maximum possible amount of resolution-enhancing data without exceeding that maximum acceptable lag time in the display of graphics, and thereby generate a visually impressive level of high-speed detail. Unfortunately, a major bottleneck exists in the calculation and estimation of functions that generate the visual display data. An advance in the calculation and estimation of functions that generate the visual display data would allow for substantial improvement in visual display system performance.

With many functions, the exact calculation of the value of the function is prohibitively slow. At the same time, information about the value of those functions, evaluated at particular input points, is critical to the generation of visual display data. Representative examples include sin(x), cos(x), $\log_2(x)$ and $\exp_2(x)$, though many other functions are involved in the calculation of visual display data. The sine and cosine functions are used in "rotation matrices", which enable a visual display data system to both rotate objects in a scene and specify arbitrary locations and orientations from which the data can be viewed. The logarithm and exponential functions are crucial to the computation of "specular highlights" on objects that are subject to 3d lighting. Substantial improvement in the generation and display of graphics will not be possible without improvements in the speed at which the estimation of the value of these, and many other, functions is accomplished. In order to accomplish desired improvement in the performance of visual display data systems, a system and method for the rapid estimation of the value of functions at particular input values within selected intervals are required.

SUMMARY OF THE INVENTION

A system, method, and computer program product are provided for generating display data. The system loads one or more coefficient values corresponding to a behavior of a selected function in one or more ranges of input data. The system then determines, responsive to one or more items of input data, one or more ranges of input data in which the selected function is to be estimated. The system then selects, through the use of a vector permute function, coefficient values corresponding to the behavior of the selected function in the determined ranges of input data, and evaluates one or more values of an index function at the one or more items of input data. It then estimates the value of the selected function through parallel mathematical operations on the one or more items of input data, the one or more selected coefficient values, and the one or more values of the index function, and, responsive to the one or more values of the selected function, generates display data.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
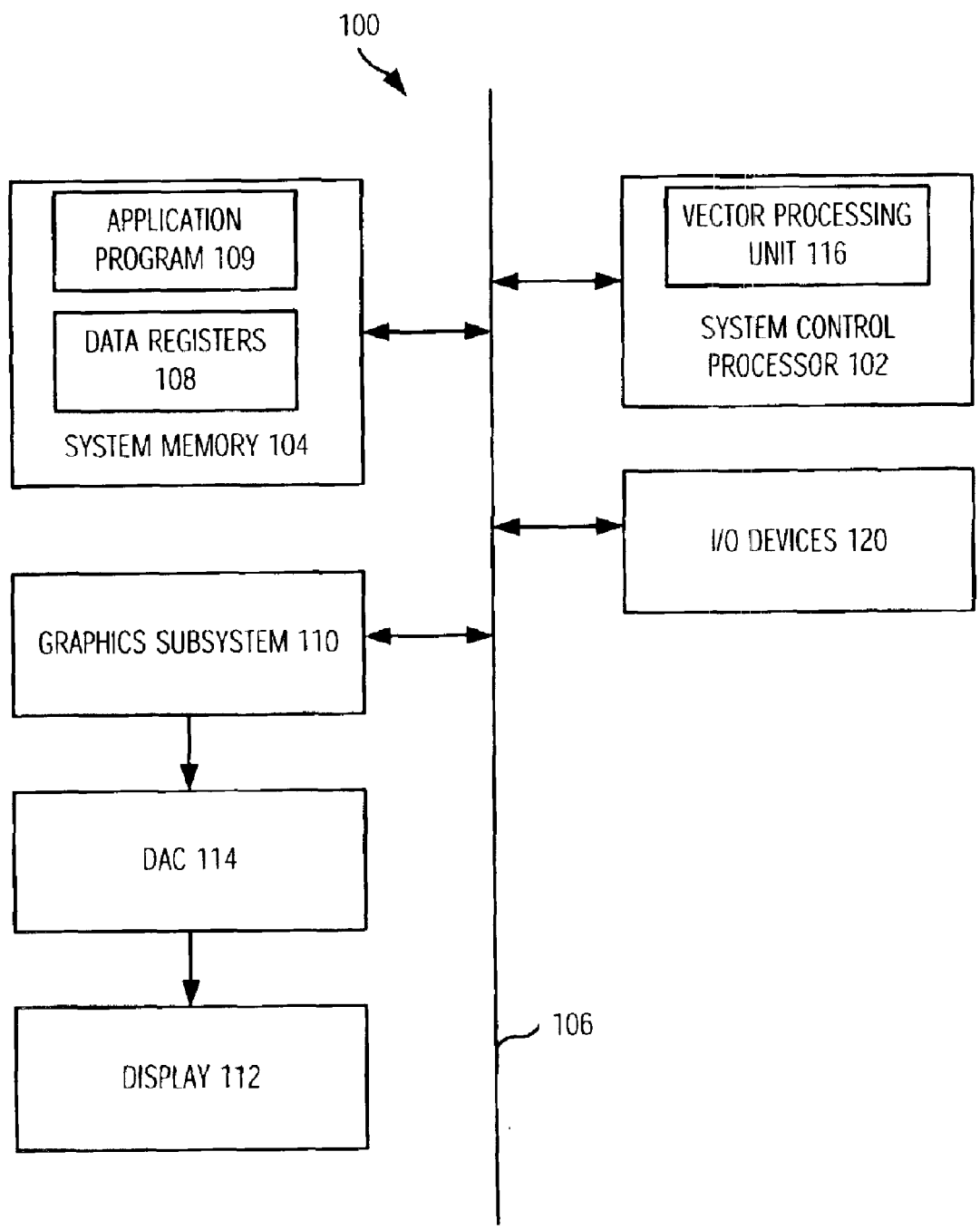
FIG. 1 depicts a data processing system equipped with a graphics processing system containing parallel processing hardware in accordance with a preferred embodiment of the present invention.

Turning now to the figures, and particularly with reference to FIG. 1, a data processing system 100 is depicted. The data processing system 100 is equipped with a graphics processing system, and contains parallel processing hardware in accordance with a preferred embodiment of the present invention. The data processing system 100 includes a system control processor 102, which is coupled to a system memory 104 via a system bus 106. The system memory 104 stores various graphical and calculational data objects and other data objects in one or more data registers 108. Examples of the system memory 104 include a random access memory (RAM). The system memory 104 also stores an application program 109 running on the system control processor 102. Preferably, the system control processor 102 provides a user-interface to navigate through and employs the graphical data objects stored in the registers 108.

The data processing system 100 also includes a graphics subsystem 110 and a display device 112. The graphics subsystem 110 interfaces to the system memory 104 via the system bus 106. Generally, the graphics subsystem 110 operates under command from the application program 109 to render the graphics data stored in the system memory 104. The graphics data (i.e., pixel data) generated by the graphics subsystem 110 is in digital form and, typically, the display device 112 requires the pixel data in analog form. In this case, a digital-to-analog converter (DAC) 114 can be placed between the graphics subsystem 110 and the display device 112 to convert the pixel data from the digital to the analog form, which is suitable for driving the display device 112.

The graphics subsystem 110 of this invention, as described below, may be implemented in hardware as, for example, a gate array (not shown) or a chip set (not shown) that includes at least one programmable sequencer, memory, integer processing unit(s) and floating point unit(s), if needed. In addition, the graphics subsystem 110 may include a parallel and/or pipelined architecture. In the alternative, the graphics subsystem 110 may be implemented in software together with a processor. The processor may be a conventional general-purpose processor, part of the system control (host) processor 102, or part of a co-processor integrated with the host processor 102.

In a preferred embodiment of the current invention, the system control processor 102 will typically contain one or more vector processing units 116. The one or more vector processing units 116 contain SIMD vector units that enable them to perform a variety of functions in parallel processing architectures. Specifically, the one or more vector processing units 116 provide access to vector permute functionality in the preferred embodiment of the present invention. The one or more vector processing units 116, acting through their STMD vector units, also typically provide a variety of mathematical functions, as well as Float-Add-Multiply functionality in the preferred embodiment of the present invention.

Though, in the preferred embodiment of the present invention, the one or more vector processing units 116 are located in the system control processor 102, alternative embodiments may involve the one or more vector processing units 116 being located in a dedicated graphics processor or in an additional processor that would interface between both a main CPU and a graphics processor. All of these configurations could support the functionality of the present invention without departing from its scope and intent.

Input/output (I/O) devices 120 interface to the system control processor 102 via the system bus 106. The I/O devices 120 may include one or more of a keyboard, template, or touch pad for text entry, a pointing device such as a mouse, trackball, or light pen for user input, and speech recognition for speech input.

Figure 2A:
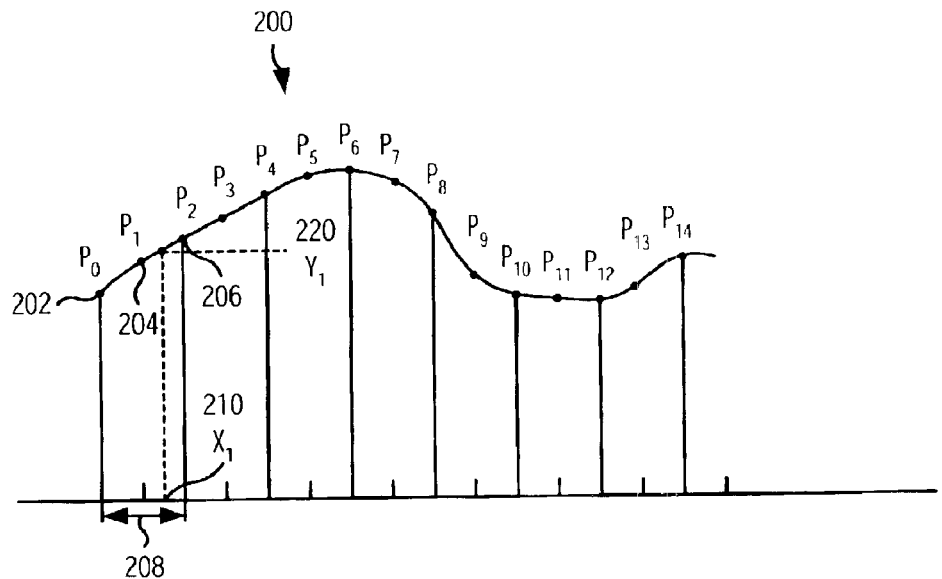
FIG. 2a is a simplified representation of a function selected for estimation using a preferred embodiment of the present invention.

Referring now to FIG. 2a, a simplified representation of a function selected for estimation using a preferred embodiment of the present invention is illustrated. The figure shows the curve of a function 200, whose behavior from one domain interval to the next will typically change in a periodic or, at least, a predictable fashion. The value of the function is known or estimated to sufficient accuracy at seventeen points, three of which are labeled $P_0$ 202, $P_1$ 204, and $P_2$ 206. The function is divided into eight intervals, and the first interval 208 is labeled. The goal of the invention is to be able to efficiently estimate the value of the selected function at a selected input value, such as $x_1$ 210, on the basis of in known values of the function, such as $P_0$ 202, $P_1$ 204, and $P_2$ 206, in the appropriate interval, such as the first interval 208 for $x_1$ 210 with one or more linear, quadratic or cubic approximations. The present invention accomplishes this goal through the use of SIMD vector permute commands and parallel float-add-multiply operations. The process of the present invention will be explained with respect to a quadratic estimation of a function, though linear, cubic, and other estimation models could be employed without departing from the scope and intent of the invention.

In a process of quadratic estimation well known to those skilled in the art, but outside the scope of this invention, the three points, $P_0$ 202, $P_1$ 204, and $P_2$ 206, can be used to calculate a best-fit parabola for the first interval 208. Thus, for the first interval 208 in the figure, it is possible to find the unique parabola, which interpolates points $P_0$ 202, $P_1$ 204, and $P_2$ 206. This parabola can be expressed by the equation $y=Ax^2+Bx+C$, which can also be written as $y=(Ax+B)x+C$. Therefore, for the first interval 208, values can be computed for A, B, and C. It is then possible, on the basis of the derived values of A, B, and C to compute $y_1$, the y-value of the curve 200 of the selected function, at a randomly selected $x_1$ 210 within the first interval 208. Note that, in the case of a linear approximation, only an A coefficient and a B coefficient would prove necessary, and, for the cubic case, an additional coefficient value D would be required.

Figure 2B:
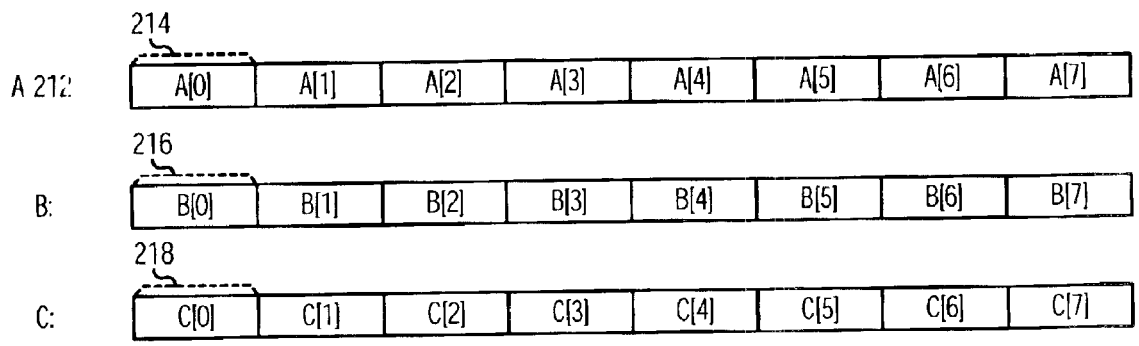
FIG. 2b depicts a matrix of coefficients used for estimation using a preferred embodiment of the present invention.

Turning now to FIG. 2b, a matrix of coefficients used for estimation using a preferred embodiment of the present invention is illustrated. For each of the eight intervals shown in FIG. 2a, three points analogous to $P_0$ 202, $P_1$ 204, and $P_2$ 206 can be used to calculate an appropriate value of each of A, B, and C as discussed above. Each of these coefficients will typically be expressed in a four-byte representation. Thus, a 4-byte coefficient value of A can be calculated, a 4-byte value of B can be calculated, and a 4-byte value of C can be calculated. Because the curve of the selected function 200 was represented by a series of eight intervals, a 32-byte array of the A values 212 can be formed, wherein the A value for the first interval 208 is represented as A[0] 214. This process can then be repeated for the B and C values, and each of the arrays can be stored in data registers 108 of the system memory 104. Then, on the basis of an input value $x_1$ 210 within the first interval 208, the preferred embodiment of the present invention can employ A[0] 214, B[0] 216, and C[0] 218 to calculate $y_1$ 220, the height of the curve 200 of the selected function at $x_1$ 210.

In a parallel computing environment, several x values may be evaluated simultaneously, creating the probability that each of several processing units will simultaneously calculate the value of the function over several the eight intervals. It is then necessary to provide the data processing system 100 with a method for determining which array element to load into each of the parallel registers for use by the parallel processing device.

Figure 3:
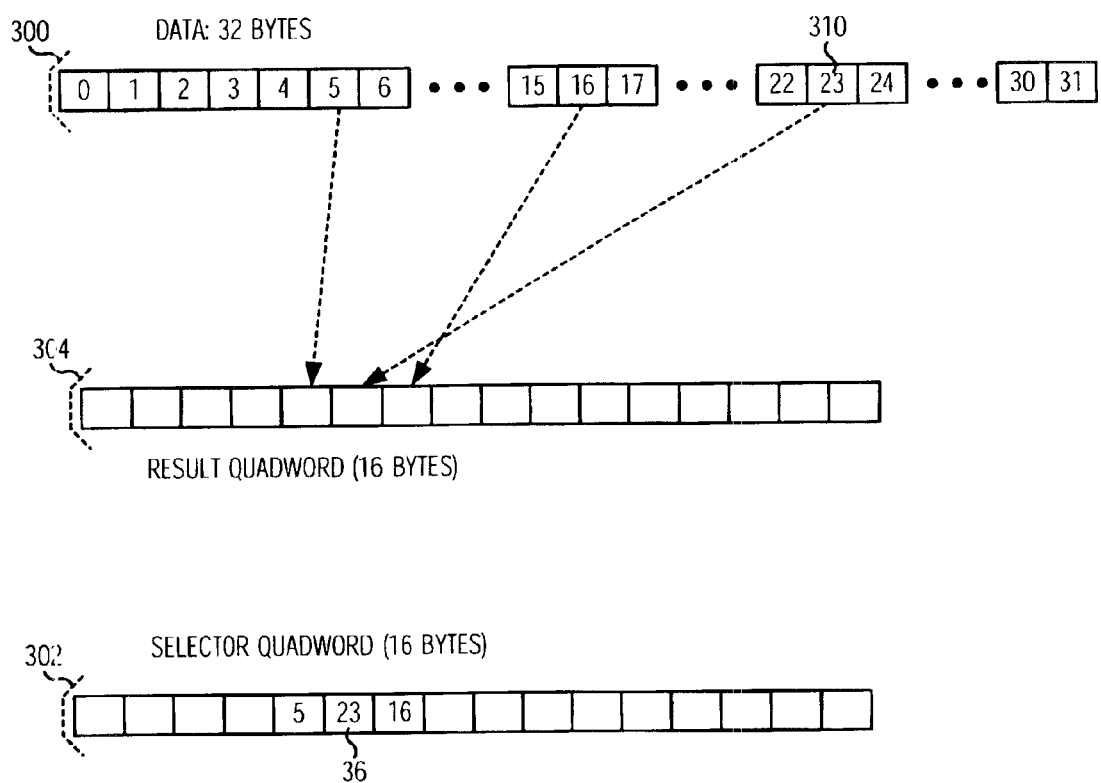
FIG. 3 is a high-level data-structure diagram reflecting the population of data bytes in a preferred embodiment of vector permute functionality in accordance with the present invention.

Referring now to FIG. 3, a high-level data-structure diagram is depicted to reflect the population of data bytes in a preferred embodiment of vector permute functionality in accordance with the present invention. The diagram shows a 32-byte data storage structure 300, a 16-byte selector quadword 302, and a 16-byte result quadword 304. Though, in the illustrative embodiment, a 32-byte data storage structure 300, a 16-byte selector quadword 302, and a 16-byte result quadword 304 will typically be employed, a data storage structure, a selector quadword, and a result quadword of other sizes could easily be employed without departing from the scope and intent of the invention. In the preferred embodiment of the present invention, providing the data processing system 100 with a method for determining which array element to load into each of the parallel registers for use by the parallel processing device is accomplished through the use of a vector permute function as illustrated herein.

In the illustrative embodiment depicted in FIG. 3, the data processing system will read each byte of the selector quadword 302 to read out an index into the 32-byte data storage structure 300. The data at the indexed location will be copied into the appropriate byte of the result quadword 304, which corresponds with the byte in the selector quadword where the index originated. For example, the sixth byte 306 of the selector quadword 302 indicates that the sixth byte 308 of the result quadword 304 should be loaded from the twenty-third byte 310 of the data storage structure 300. Once this information is read from the sixth byte 306 of the selector quadword 302, then the SIMD vector unit 116 can transfer the data from the twenty-third byte 310 of the data storage structure 300 to the sixth byte 308 of the result quadword 304. Thus, the SIMD vector permute function allows the SIMD vector unit 116 to transfer any selected byte from a designated location in the data storage structure 300 to any designated byte in the result quadword 304 by designating that byte in the selector quadword.

Recalling the function diagrammed in FIG. 2a and the coefficient matrix diagrammed in FIG. 2b, a 32-byte array of the A values 212 can be formed, wherein the A value for the first interval 208, a single-precision floating point number of one word or 4 bytes in length, is represented as A[0] 214, but the SIMD vector permute function, as detailed in FIG. 3, provides for the transfer of only one byte at a time. The preferred embodiment of the present invention includes a method for using the SIMD vector permute function to transfer, in multiple and contiguous steps, the A value for the first interval 208, a single-precision floating point number of one word or 4 bytes in length, that is represented as A[0] 214, from the 32-byte data storage structure 300 to the 16-byte result quadword 304.

Figure 4A:
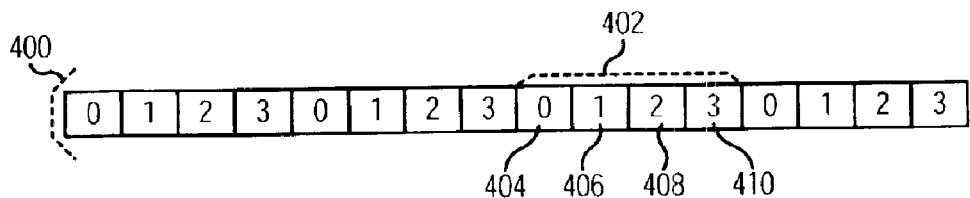
FIG. 4a, depicts a data-structure diagram of the initialization state of the selector quadword in accordance with a preferred embodiment of the present invention.

Turning now to FIG. 4a, a data-structure diagram of the initialization state of the selector quadword in accordance with a preferred embodiment of the present invention is illustrated. FIG. 4a shows a selector quadword 400, divided into a series of 16 bytes. Each four bytes represent a selector word, such as the third selector word 402, composed of byte 9 404, byte 10 406, byte 11 408, and byte 12 410. Each word of four bytes, such as the third selector word 402, represents an instruction to select a 4-byte word from the thirty-two data storage structure 300 that holds a thirty-two byte coefficient array such as the A array 212. As before, each byte in the selector word corresponds to an instruction to load a byte from the 32-byte data storage structure 300. The last two bits of byte 9 404 contain a 0, or 00 in binary. The last two bits of byte 10 406 contain a 1, or 01 in binary. The last two bits of byte 11 408 contain a 2, or 10 in binary. The last two bits of byte 12 410 contain a 3, or 11 in binary. In order to extract the desired four of the eight single-precision floating point numbers (4 bytes each) from the 32-byte data storage structure 300, the selector quadword 400 must be initialized so as to insure that the SIMD vector unit will copy these the bytes sequentially, "a word at a time". First, the selector quadword is initialized, so that the bottom two bits of each byte select the right byte of a given data word ("00", "01", "10" and "11") or (0, 1, 2, 3), as discussed above. That is, in order to insure that all four bytes of the four byte coefficient indicated by the third selector word 400 are copied in correct order, the last two bits of byte 9 404 contain a 0, or 00 in binary, the last two bits of byte 10 406 contain a 1, or 01 in binary, the last two bits of byte 11 408 contain a 2, or 10 in binary, and the last two bits of byte 12 410 contain a 3, or 11 in binary. This arrangement of the last two bits of each byte insurers that constituent bytes of whatever word are selected from the coefficient matrix is copied sequentially by the vector permute function.

Figure 4B:
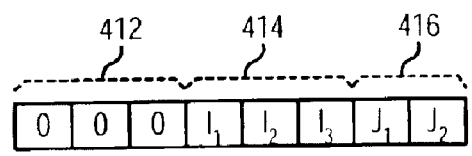
FIG. 4b, is a data-structure diagram of the content of a single byte in a selector quadword in accordance with a preferred embodiment of the present invention.

Referring now to FIG. 4b, a data-structure diagram of the content of a single byte in a selector quadword, in accordance with a preferred embodiment of the present invention, is depicted. The byte contains three leading zeroes 412, followed by three index bits 414, and three component bits 416. The three index bits 414 correspond to one of the eight regions of the function in the quadratic approximation of discussed in reference to FIG. 2, such as the first region 208. The three component bits 416 were set during the initialization process described with reference to FIG. 4a, and insure that constituent bytes of whatever word are selected from the coefficient matrix are copied sequentially by the vector permute function. The leading zeroes 412, though serving only as placeholders in an eight-coefficient embodiment, would be replaced by index bits in an embodiment employing a larger matrix of coefficients.

Figure 4C:
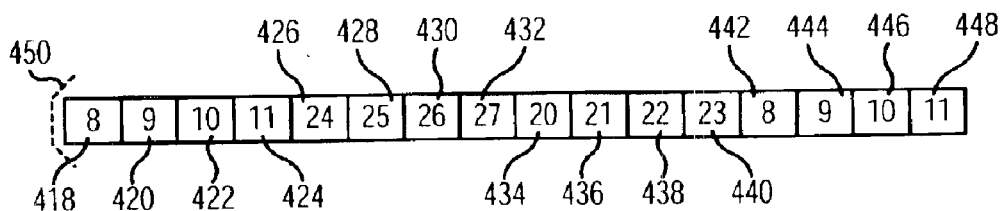
FIG. 4c depicts a data-structure diagram of the populated state of the selector quadword in accordance with a preferred embodiment of the present invention.

Turning now to FIG. 4c, a data-structure diagram of the populated state of the selector quadword in accordance with a preferred embodiment of the present invention is illustrated. The selector quadword now contains 16 bytes 418–448. Once a selector quadword 450 is initialized under the process described in FIG. 4a, the data processing system 100 will compute an index in order to determine the source from which, among the array of eight floating point numbers, the data processing system needs to load into each of the words of the result. This process of determining indices is outside the scope of this invention, and could be implemented through a variety of processes that are well understood in the prior art. For example, assume that the data processing system has determined that four input values to the parallel process correspond with indices and 'A' coefficients 2, 6, 5, and 2 from the A coefficient matrix 212. The data processing system 100 would then load these values ("010", "110," "101" and "010") representing (2, 6, 5, 2) into the selector quadword 400 into the three index bits of each byte 414, so that the full contents of the selector quadword 400 are as follows:

First byte 418=00001000→8
Second byte 420=00001001→9
Third byte 422=00001010→10
Fourth byte 424=00001011→11
Fifth byte 426=00011000→24
Sixth byte 428=00011001→25
Seventh byte 430=00011010→26
Eighth byte 432=00011011→27
Ninth byte 434=00010100→20
Tenth byte 436=00010101→21
Eleventh byte 438=00010110→22
Twelfth byte 440=00010111→23
Thirteenth byte 442=00001000→8
Fourteenth byte 444=00001001→9
Fifteenth byte 446=00001010→10
Sixteenth byte 448=00001011→11

Figure 5:
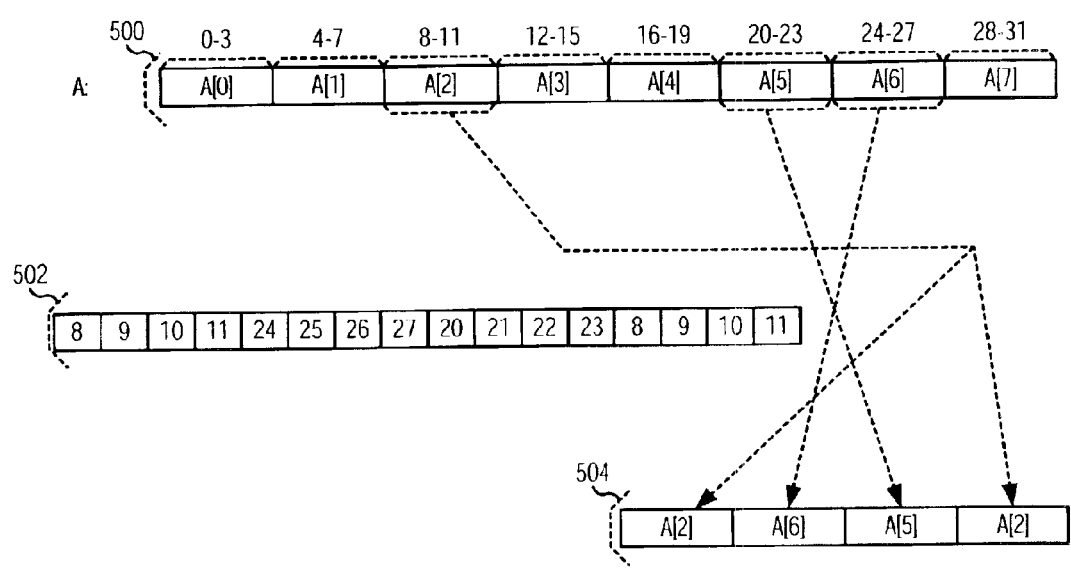
FIG. 5 is a high-level data-structure diagram reflecting the population of data bytes in a preferred embodiment of vector permute functionality, adapted to load word-sized coefficients, in accordance with the present invention.

Referring now to FIG. 5, a high level data-structure diagram reflecting the population of data bytes in a preferred embodiment of vector permute functionality, adapted to load word-sized coefficients, in accordance with the present invention, is depicted. The diagram shows a 32-byte data storage structure 500, populated with the A coefficient matrix 212, a 16-byte selector quadword 502, populated with the selector bytes 418-448 that were calculated with reference to FIG. 4c, and a 16-byte result quadword 504, loaded with the 'A' coefficients 2, 6, 5, and 2 from the A coefficient matrix 212. When the data processing system applies the selector quadword 502 to the hardware vector permute operator in the SIMD vector unit of the vector processing unit 116, the operator causes the vector processing unit 116, having loaded the "A" array into the 32-byte data area 502, to load the appropriate word out of the data storage structure 500 containing the 'A' coefficient array 212 and copy it into the 4-way register for the parallel process, at the right location, as described with reference to FIG. 3.

This operation is fast and efficient. The process can then be repeated with the SAME selector quadword 502, pointing the hardware at the "B" array of data, stored elsewhere and not shown, and a new "result" quadword, stored elsewhere and not shown, and then at the "C" array of data, and a third "result" quadword, stored elsewhere and not shown. Thus, in a very small number of cycles, the data processing system has accomplished twelve (3×4) table lookups, and can proceed with the computations of the function estimates.

Figure 6:
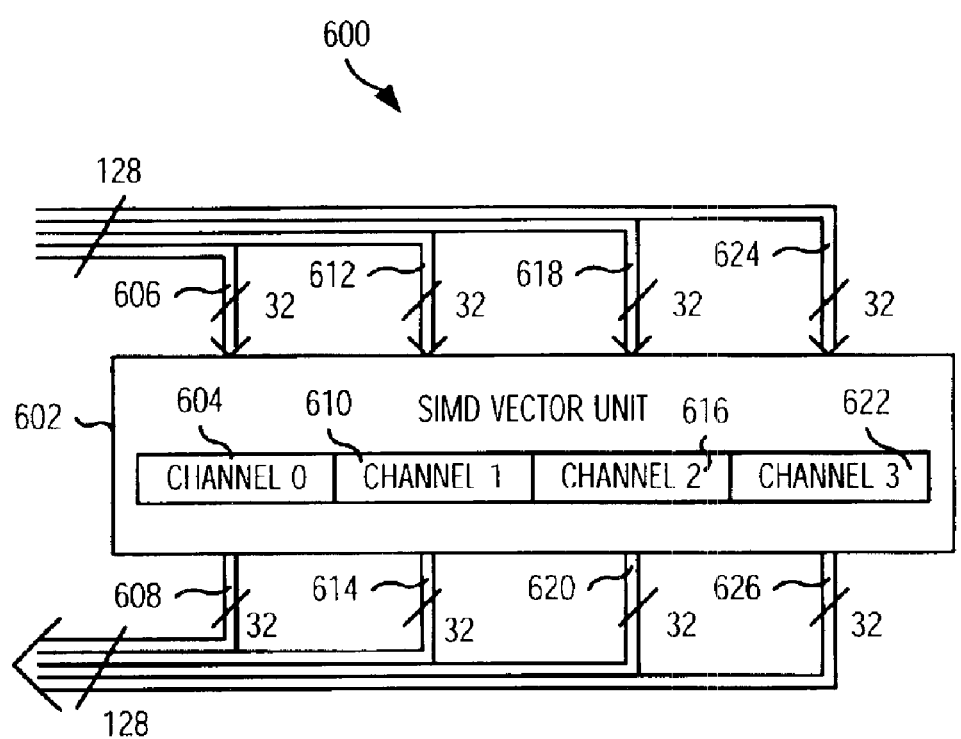
FIG. 6 is a schematic representation of a vector processing unit of a data processing system containing parallel processing hardware in accordance with a preferred embodiment of the present invention.

Referring now to FIG. 6, a schematic representation of a vector processing unit of with a graphics processing system containing parallel processing hardware in accordance with a preferred embodiment of the present invention is illustrated. The vector processing unit 600 contains a SIMD vector unit 602. The SIMD vector unit 602 provides manipulation and mathematical processing of vector elements. The SIMD vector unit 602 allows for the performance, simultaneously and in parallel, of mathematical operations on multiple items of data. In the preferred embodiment, the SIMD vector unit 602 will typically contain 4 data processing units. The first data processing unit 604 manipulates and performs mathematical operations on 32-byte-wide data received from a 32-byte-wide input 606, and then provides its results as output to a 32-byte wide output 608. The second data processing unit 610 manipulates and performs mathematical operations on 32-byte-wide data received from a 32-byte-wide input 612, and then provides its results as output to a 32-byte wide output 614. The third data processing unit 616 manipulates and performs mathematical operations on 32-byte-wide data received from a 32-byte-wide input 618, and then provides its results as output to a 32-byte wide output 620. The fourth data processing unit 622 manipulates and performs mathematical operations on 32-byte-wide data received from a 32-byte-wide input 624, and then provides its results as output to a 32-byte wide output 626.

Figure 7:
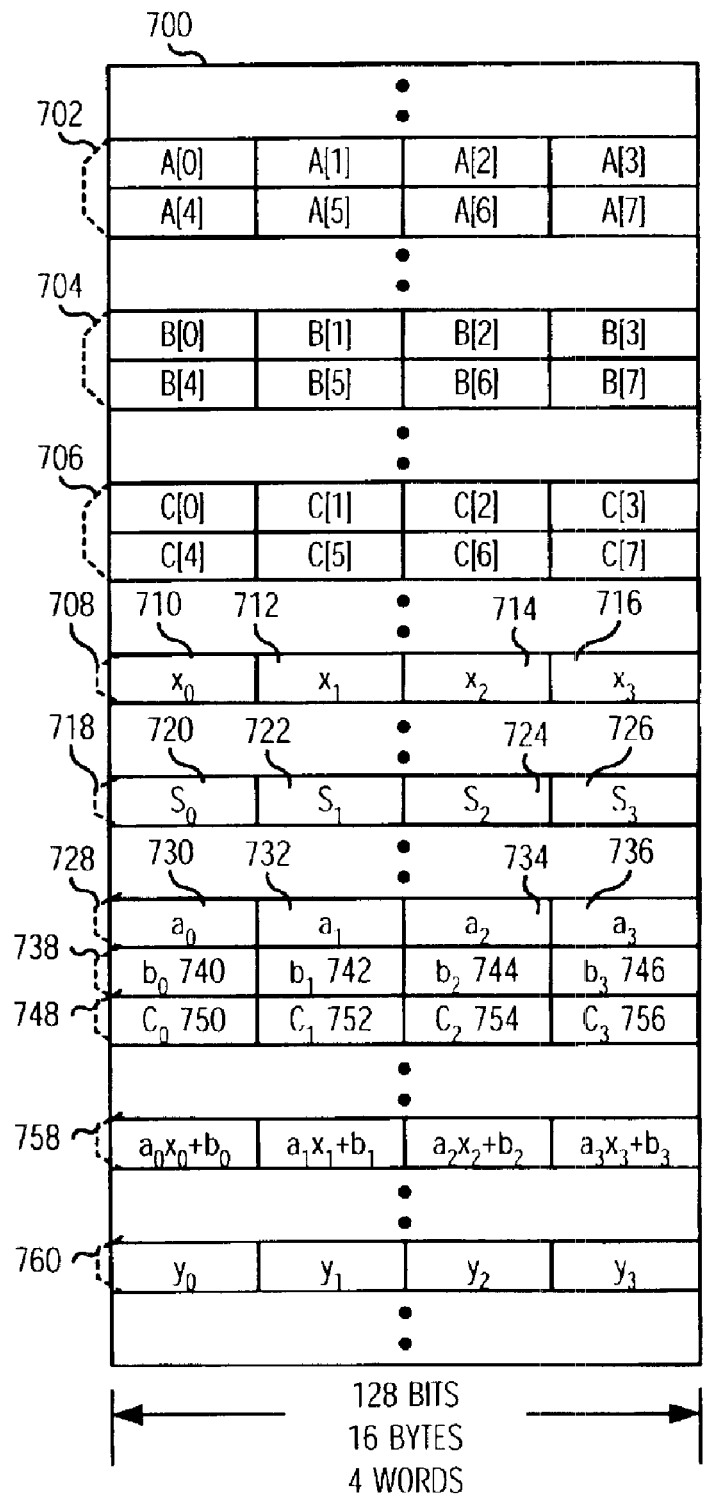
FIG. 7 depicts the content of several registers in the RAM of a graphics processing system containing parallel processing hardware in accordance with a preferred embodiment of the present invention.

Referring now to FIG. 7, the content of several registers in the RAM of a graphics processing system containing parallel processing hardware in accordance with a preferred embodiment of the present invention is illustrated. The data registers 700 contain several items of calculational data 702–718, each of which is either 16 or 32 bytes in length. The first calculational data item 702 contains the 'A' coefficient array 212. The second calculational data item 704 contains the 'B' coefficient array 216. The third calculational data item 706 contains the 'C' coefficient array 218. The fourth calculational data item 708 contains four items of input data: $x_0$ 710, $x_1$ 712, $x_2$ 714, and $x_3$ 716. The fifth calculational data item 718 contains four selector quadwords: $s_0$ 720, $s_1$ 722, $S_2$ 724, and $S_3$ 726. The sixth calculational data item 728 contains four 'A' coefficients drawn from the 'A' coefficient array 212 on the basis of the selector quadwords in the fifth calculational data item 718. Those coefficients are $a_0$ 730, $a_1$ 732, $a_2$ 734, and $a_3$ 736. The seventh calculational data item 738 contains four 'B' coefficients drawn from the 'B' coefficient array 216 on the basis of the selector quadwords in the fifth calculational data item 718. Those coefficients are $b_0$ 740, $b_1$ 742, $b_2$ 744, and $b_3$ 746. The eighth calculational data item 748 contains four 'C' coefficients drawn from the 'C' coefficient array 218 on the basis of the selector quadwords in the fifth calculational data item 718. Those coefficients are $c_0$ 740, $c_1$ 742, $c_2$ 744, and $c_3$ 746. The ninth calculational data item 758 contains intermediate results of the quadratic estimation in accordance with a preferred embodiment of the present invention. The tenth calculational data item 760 contains final results of the quadratic estimation in accordance with a preferred embodiment of the present invention.

Recalling from FIG. 1, the data processing system seeks to estimate the value of a function at a given input value. Here, the given input value is called x. In a parallel processing environment, the data processing system seek will typically estimate the value of a function simultaneously at several given input values, $x_0$ 710, $x_1$ 712, $x_2$ 714, and $x_3$ 716. The data processing system will simultaneously estimate $y=f(x)$ for several x's, where the data processing system approximates the function $f(x)$ as a series of piecewise contiguous polynomials (perhaps linear, perhaps quadratic, perhaps cubic). For the purposes of the preferred embodiment, they are quadratic polynomials. For the purposes of the preferred embodiment, there are eight such polynomials, but any number could have been used, based on the availability of an appropriate vector permute function (as described above in the discussion of prior art).

A process outside the scope of this invention computes the appropriate data to put into the A[0 . . . 7] 212, B[0 . . . 7] 216 and C[0 . . . 7] 218 arrays, said data representing the coefficients of these piecewise contiguous quadratic functions. At some point, these arrays are loaded into three pairs of adjacent registers as the first calculational data item 702, the second calculational data item 704, and the third calculational data item 706. Given a stream of x inputs to process, the data processing system executes a loop which proceeds through the stream and grabs the inputs $x_0$ 710, $x_1$ 712, $x_2$ 714, and $x_3$ 716, four at a time, and loads them into a register as the fourth calculational data item 708. Some simple manipulation of each of the x values 710–716 (outside the scope of this disclosure) generates a 3-bit index into the A, B and C arrays for each of the four input x values. These indices are incorporated into the selector quadwords 720–726 in the fourth calculational data item 718 according to the method documented above.

Next, the vector permute instruction is used to load appropriate coefficients as described above. The SIMD vector unit 622 in the vector processing unit 116 employs the first calculational data item 702, which contains the 'A' coefficient array 212, and the fifth calculational data item 718, which contains the four selector quadwords, to load the sixth calculational data item 728, the four 'A' coefficients drawn from the 'A' coefficient array 212. These include $a_0$ 730, $a_1$ 732, $a_2$ 734, and $a_3$ 736, loaded on the basis of the four selector quadwords. The SIMD vector unit then employs the second calculational data item 704, which contains the 'B' coefficient array 216, and the fifth calculational data item 718, which contains four selector quadwords, to load the seventh calculational data item 738, the four 'B' coefficients drawn from the 'B' coefficient array 216. These include: $b_0$ 740, $b_1$ 742, $b_2$ 744, and $b_3$ 746. The SIMD vector unit then employs the third calculational data item 706, which contains the 'C' coefficient array 218, and the fifth calculational data item 718, which contains four selector quadwords, to load the eighth calculational data item 748, the four 'C' coefficients drawn from the 'C' coefficient array 216. These include: $c_0$ 740, $c_1$ 742, $c_2$ 744, and $c_3$ 746, loaded on the basis of the four selector quadwords.

The SIMD vector unit 222 of the vector processing unit 116 then performs a float-add-multiply operation, implementing the quadratic interpolation explained with reference to FIG. 1, in parallel on the fourth calculational data item 708, the sixth calculational data item 728, and the seventh calculational data item 728 to generate an intermediate result in the form of the ninth calculational data item 758. The SIMD vector unit 222 of the vector processing unit 116 then performs a second "FMA" operation on fourth calculational data item 708, the ninth calculational data item 758, and the eighth calculational data item 748 to generate the 'y' output values, the tenth calculational data item 760. The data processing system 100 will then employ the 'y' output values, the tenth calculational data item 760 to generate graphics output.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A method for generating display data, the method comprising the steps of:
   loading one or more coefficient values corresponding to a behavior of a selected function in one or more ranges of input data;
   determining, responsive to one or more items of input data, one or more ranges of input data in which the selected function is to be estimated;
   selecting, through the use of a vector permute function, the one or more coefficient values corresponding to the behavior of the selected function in the one or more determined ranges of input data;
   evaluating one or more values of an index function at the one or more items of input data;
   estimating one or more values of the selected function through parallel mathematical operations on the one or more items of input data, the one or more selected coefficient values, and the one or more values of the index function; and
   responsive to the one or more values of the selected function, generating display data.

2. The method of claim 1, wherein the step of loading further comprises the step of loading the one or more coefficient values into one or more storage registers.

3. The method of claim 1, wherein the step of selecting further comprises the step of loading the one or more coefficient values into one or more calculational buffers.

4. The method of claim 1, wherein the step of estimating further comprises the step of performing an interpolation of the selected function by using one of the set of linear interpolation of the selected function, quadratic interpolation of the selected function, and cubic interpolation of the selected function.

5. The method of claim 1, wherein the step of estimating further comprises the step of estimating functions involving $\sin(x)$, $\cos(x)$, $\log_2(x)$ and $\exp_2(x)$, wherein x represents an input variable.

6. The method of claim 1, wherein the step of estimating is performed in a dedicated graphics processor.

7. The method of claim 1, wherein the step of estimating further comprises the step of performing one or more float-add-multiply operations.

8. The method of claim 1, wherein the step of estimating further comprises the step of performing a quadratic interpolation of the function.

9. A method for generating display data, the method comprising the steps of:
   loading one or more coefficient values corresponding to a behavior of a selected function in one or more ranges of input data;
   receiving, responsive to one or more items of input data, one or more ranges of input data in which the selected function is to be estimated;
   selecting, through the use of a vector permute function, the one or more coefficient values corresponding to the behavior of the selected function in the one or more determined ranges of input data;
   receiving one or more values of an index function at the one or more items of input data;
   estimating one or more values of the selected function through parallel mathematical operations on the one or more items of input data, the one or more selected coefficient values, and the one or more values of the index function; and
   responsive to the one or more values of the selected function, generating display data.

10. The method of claim 1, wherein the step of loading further comprises the step of loading the one or more coefficient values into one or more storage registers.

11. The method of claim 1, wherein the step of selecting further comprises the step of loading the one or more coefficient values into one or more calculational buffers.

12. A system for generating display data, the system comprising:
   means for loading one or more coefficient values corresponding to a behavior of a selected function in one or more ranges of input data;
   means for determining, responsive to one or more items of input data, one or more ranges of input data in which the selected function is to be estimated;
   means for selecting, through the use of a vector permute function, the one or more coefficient values corresponding to the behavior of the selected function in the one or more determined ranges of input data;

means for evaluating one or more values of an index function at the one or more items of input data;

means for estimating one or more values of the selected function through parallel mathematical operations on the one or more items of input data, the one or more selected coefficient values, and the one or more values of the index function; and means for, responsive to the one or more values of the selected function, generating display data.

13. The system of claim 12, wherein the means for loading further comprise means for loading the one or more coefficient values into one or more storage registers.

14. The system of claim 12, wherein the means for selecting further comprise means for loading the one or more coefficient values into one or more calculational buffers.

15. The system of claim 12, wherein the means for estimating further comprise means for performing an interpolation of the selected function by using one of the set of linear interpolation of the selected function, quadratic interpolation of the selected function, and cubic interpolation of the selected function.

16. The system of claim 12, wherein the means for estimating further comprise means for estimating functions involving $\sin(x)$, $\cos(x)$, $\log_2(x)$ and $\exp_2(x)$, wherein x represents an input variable.

17. The system of claim 12, wherein the means for estimating are located in a dedicated graphics processor.

18. The system of claim 12, wherein the means for estimating further comprise means for performing one or more float-add-multiply operations.

19. The system of claim 12, wherein the means for estimating further comprise means for performing a quadratic interpolation of the function.

20. A system for generating display data, the system comprising:

means for loading one or more coefficient values corresponding to a behavior of a selected function in one or more ranges of input data;

means for receiving, responsive to one or more items of input data, one or more ranges of input data in which the selected function is to be estimated;

means for selecting, through the use of a vector permute function, the one or more coefficient values corresponding to the behavior of the selected function in the one or more determined ranges of input data;

means for receiving one or more values of an index function at the one or more items of input data;

means for estimating one or more values of the selected function through parallel mathematical operations on the one or more items of input data, the one or more selected coefficient values, and the one or more values of the index function; and means for, responsive to the one or more values of the selected function, generating display data.

21. The system of claim 20, wherein the means for loading further comprise means for loading the one or more coefficient values into one or more storage registers.

22. The system of claim 20, wherein the means for selecting further comprise means for loading the one or more coefficient values into one or more calculational buffers.

23. A computer program product for generating display data, the computer program product having a medium with a computer program embodied thereon, the computer program comprising:

computer program code for loading one or more coefficient values corresponding to a behavior of a selected function in one or more ranges of input data;

computer program code for determining, responsive to one or more items of input data, one or more ranges of input data in which the selected function is to be estimated;

computer program code for selecting, through the use of a vector permute function, the one or more coefficient values corresponding to the behavior of the selected function in the one or more determined ranges of input data;

computer program code for evaluating one or more values of an index function at the one or more items of input data;

computer program code for estimating one or more values of the selected function through parallel mathematical operations on the one or more items of input data, the one or more selected coefficient values, and the one or more values of the index function; and computer program code for, responsive to the one or more values of the selected function, generating display data.

24. The computer program product of claim 23, wherein the computer program code for loading further comprises computer program code for loading the, one or more coefficient values into one or more storage registers.

25. The computer program product of claim 23, wherein the computer program code for selecting further comprises computer program code for loading the one or more coefficient values into one or more calculational buffers.

26. The computer program product of claim 23, wherein the computer program code for estimating further comprises computer program code for performing an interpolation of the selected function by using one of the set of linear interpolation of the selected function, quadratic interpolation of the selected function, and cubic interpolation of the selected function.

27. The computer program product of claim 23, wherein the computer program code for estimating further comprises computer program code for estimating functions involving $\sin(x)$, $\cos(x)$, $\log_2(x)$ and $\exp_2(x)$, wherein x represents an input variable.

28. The computer program product of claim 23, wherein the computer program code for estimating is executed in a dedicated graphics processor.

29. The computer program product of claim 23, wherein the computer program code for estimating further comprises computer program code for performing one or more float-add-multiply operations.

30. The computer program product of claim 23, wherein the computer program code for estimating further comprises computer program code for performing a quadratic interpolation of the function.

31. A computer program product for generating display data, the computer program product having a medium with a computer program embodied thereon, the computer program comprising:

computer program code for loading one or more coefficient values corresponding to a behavior of a selected function in one or more ranges of input data;

computer program code for receiving, responsive to one or more items of input data, one or more ranges of input data in which the selected function is to be estimated;

computer program code for selecting, through the use of a vector permute function, the one or more coefficient values corresponding to the behavior of the selected function in the one or more determined ranges of input data;

computer program code for receiving one or more values of an index function at the one or more items of input data;

computer program code for estimating one or more values of the selected function through parallel mathematical operations on the one or more items of input data, the one or more selected coefficient values, and the one or more values of the index function; and computer program code for, responsive to the one or more values of the selected function, generating display data.

32. The computer program product of claim 31, wherein the computer program code for loading further comprises computer program code for loading the one or more coefficient values into one or more storage registers.

33. The computer program product of claim 31, wherein the computer program code for selecting further comprises computer program code for loading the one or more coefficient values into one or more calculational buffers.

* * * * *